United States Patent
Kato et al.

(10) Patent No.: US 12,279,627 B2
(45) Date of Patent: Apr. 22, 2025

(54) METHOD FOR PRODUCING SOLID FOOD PRODUCT, AND METHOD FOR PRODUCING SOLID MILK INCLUDING HARDENING TREATMENT

(71) Applicant: Meiji Co., Ltd., Tokyo (JP)

(72) Inventors: Aya Kato, Tokyo (JP); Keigo Hanyu, Tokyo (JP); Tetsu Kamiya, Tokyo (JP); Jin Ogiwara, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 269 days.

(21) Appl. No.: 17/641,719

(22) PCT Filed: Jul. 31, 2020

(86) PCT No.: PCT/JP2020/029579
§ 371 (c)(1),
(2) Date: Mar. 9, 2022

(87) PCT Pub. No.: WO2021/049201
PCT Pub. Date: Mar. 18, 2021

(65) Prior Publication Data
US 2022/0330566 A1  Oct. 20, 2022

(30) Foreign Application Priority Data

Sep. 13, 2019 (JP) .................. 2019-167795

(51) Int. Cl.
*A23C 9/18* (2006.01)
*A23C 9/16* (2006.01)
(52) U.S. Cl.
CPC .................. *A23C 9/18* (2013.01); *A23C 9/16* (2013.01); *A23C 2210/15* (2013.01)

(58) Field of Classification Search
CPC .......... A23C 9/18; A23C 9/16; A23C 2210/15
(Continued)

(56) References Cited

U.S. PATENT DOCUMENTS

| 2008/0292770 A1 | 11/2008 | Shibata et al. |
| 2009/0162489 A1 | 6/2009 | Singh |

(Continued)

FOREIGN PATENT DOCUMENTS

| CN | 106998720 | 8/2017 |
| EP | 2 090 175 | 8/2009 |

(Continued)

OTHER PUBLICATIONS

International Search Report dated Sep. 24, 2020 in International (PCT) Application No. PCT/JP2020/029579.

(Continued)

*Primary Examiner* — Brent T O'Hern
(74) *Attorney, Agent, or Firm* — WENDEROTH, LIND & PONACK, L.L.P.

(57) ABSTRACT

A method for producing a solid food having a solid form obtained by compression molding a food powder includes: compression molding the food powder to form a compression molded body of the food powder; and performing a hardening treatment on the compression molded body of the food powder, in which the hardening treatment includes placing the compression molded body of the food powder under an environment of a humidity of 100% RH or less and a temperature of higher than 100° C.

10 Claims, 3 Drawing Sheets

(58) Field of Classification Search
USPC .......................................................... 426/588
See application file for complete search history.

(56) References Cited

U.S. PATENT DOCUMENTS

| | | |
|---|---|---|
| 2011/0244107 A1 | 10/2011 | Toyoda et al. |
| 2014/0017367 A1 | 1/2014 | Rastello-De Boisseson et al. |
| 2014/0377440 A1 | 12/2014 | Shibata et al. |

FOREIGN PATENT DOCUMENTS

| | | | |
|---|---|---|---|
| EP | 3 338 557 | 6/2018 | |
| EP | 3338557 A1 * | 6/2018 | ............... A23C 9/16 |
| GB | 814924 | 6/1959 | |
| JP | 2004-49220 | 2/2004 | |
| JP | 2007-236269 | 9/2007 | |
| JP | 2012-196228 | 10/2012 | |
| JP | 2013-172742 | 9/2013 | |
| JP | 5350799 | 11/2013 | |
| JP | 5688020 | 3/2015 | |
| JP | 2017-131168 | 8/2017 | |
| RU | 2 618 866 | 1/2012 | |
| WO | 2006/004190 | 1/2006 | |
| WO | 2010/073724 | 7/2010 | |
| WO | 2013/001052 | 1/2013 | |
| WO | 2014/102316 | 7/2014 | |
| WO | 2016/032320 | 3/2016 | |

OTHER PUBLICATIONS

Extended European Search Report issued Feb. 17, 2021 in European Patent Application No. 20194327.1.
Li et al. "Comparative study on the characteristics and oxidation stability of commercial milk powder during storage", Journal of Dairy Science, 2019, vol. 102, No. 10, pp. 8785-8797, 13 pages.
Office Action issued Oct. 26, 2023, in Indonesian Patent Application No. P00202203060, with English translation, 6 pages.
Office Action and Search Report issued Jan. 31, 2024 in corresponding Russian Patent Application No. 2022106275, with English language translation. AttachZ.
Office Action issued Apr. 13, 2024 in Chinese Patent Application No. 202080017813.5, with English-language translation.

* cited by examiner

METHOD FOR PRODUCING SOLID FOOD PRODUCT, AND METHOD FOR PRODUCING SOLID MILK INCLUDING HARDENING TREATMENT

TECHNICAL FIELD

The present invention relates to a method for producing a solid food and a method for producing a solid milk.

BACKGROUND ART

As a solid food, a solid milk obtained by compression molding a powdered milk is known (see PTL 1 and PTL 2). This solid milk is required to have such solubility that it quickly dissolves when placed in warm water. At the same time, transportation suitability, that is, resistance to breakage that prevents breakage such as cracking or collapse from occurring during transportation or carrying, is also required.

CITATION LIST

Patent Literature

PTL 1: Japanese Patent No. 5,350,799
PTL 2: Japanese Patent No. 5,688,020

SUMMARY OF THE INVENTION

Technical Problem

It is desired that a powder or a powdered milk is compression molded to produce a solid food and a solid milk which have easily handled strength and improved solubility.

An object of the invention is to provide a method for producing a solid food having suitable solubility and easily handled strength and a method for producing a solid milk having suitable solubility and easily handled strength.

Solution to Problem

A method for producing a solid food according to the present invention is a method for producing a solid food having a solid form obtained by compression molding a food powder, the method including: compression molding the food powder to form a compression molded body of the food powder; and performing a hardening treatment on the compression molded body of the food powder, in which the hardening treatment includes placing the compression molded body of the food powder under an environment of a humidity of 100% relative humidity (RH) or less and a temperature of higher than 100° C.

A method for producing a solid milk according to the present invention is a method for producing a solid milk having a solid form obtained by compression molding a powdered milk, the method including: compression molding the powdered milk to form a compression molded body of the powdered milk; and performing a hardening treatment on the compression molded body of the powdered milk, in which the hardening treatment includes placing the compression molded body of the powdered milk under an environment in which a humidity is 100% RH or less and a temperature is higher than 100° C.

Advantageous Effects of the Invention

According to the method for producing a solid food of the present invention, the solid food excellent in solubility while having the same hardness as that of a conventional solid food can be produced. Therefore, in the method for producing a solid food of the present invention, a solid food having suitable solubility and easily handled strength can be produced.

According to the method for producing a solid milk of the present invention, the solid milk excellent in solubility while having the same hardness as that of a conventional solid milk can be produced. Therefore, in the method for producing a solid milk of the present invention, a solid milk having suitable solubility and easily handled strength can be produced.

DESCRIPTION OF EMBODIMENTS

Hereinafter, an embodiment of the present invention will be described. However, the embodiment to be described below is merely an example and can be appropriately modified within an apparent range for those skilled in the art.

Figure 1:
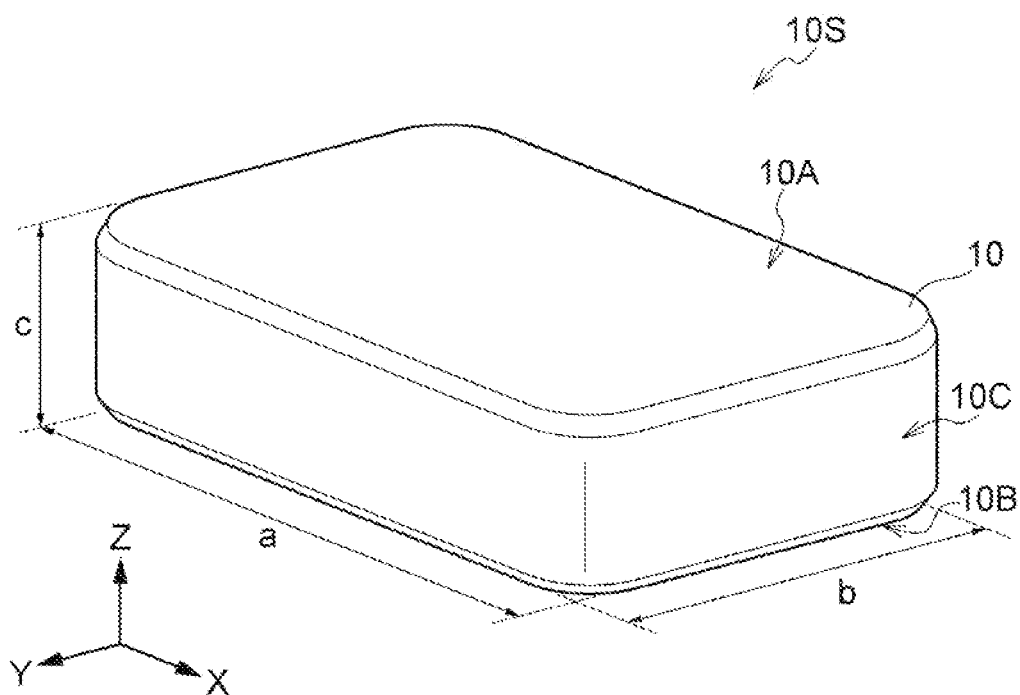
FIG. 1 is a perspective view of a solid milk according to an embodiment.

Embodiment (Configuration of Solid Milk 10S)
FIG. 1 is a perspective view of a solid milk 10S according to the present embodiment.

The solid milk 10S has a body 10 having a solid form obtained by compression molding a powdered milk. The body 10 has a first face 10A that is flat and parallel to an XY plane and a second face 10B that is flat and parallel to the XY plane. The first face 10A and the second face 10B are faces facing each other back to back. The shape of the body 10 is determined depending on the shape of a mold (a die of a tablet press) used in compression molding, but is not particularly limited as long as it is a shape having a certain degree of dimension (size, thickness, angle). The schematic shape of the body 10 is a round column shape, an elliptical column shape, a cubic shape, a rectangular parallelepiped shape, a plate shape, a polygonal column shape, a polygonal pyramid shape, a polyhedron shape, or the like. From the viewpoint of simplicity of molding, convenience of transportation, or the like, a round column shape, an elliptical column shape, and a rectangular parallelepiped shape are preferred. The schematic shape of the body 10 of the solid milk 10S illustrated in FIG. 1 is a rectangular parallelepiped shape having a dimension of a×b×c (see FIG. 1) and the body 10 has a lateral face 10C parallel to the XZ plane or the YZ plane.

A corner part of the body 10 configured by the first face 10A and the lateral face 10C and a corner part of the body 10 configured by the second face 10B and the lateral face 10C are chamfered to be tapered inclined faces. A corner part configured by a face parallel to the YZ plane and a face parallel to an XZ plane in the lateral face 10C may have a rounded shape. By the corner part being chamfered or rounded, the situation of the solid milk 10S being fractured when being transported, etc. can be suppressed.

A surface is a face that forms the outside of a material. A surface layer is a layer near the surface (vicinity of the surface) including the surface. For example, the surface layer is a layer formed by compression molding a powdered milk and further hardening through the hardening treatment. The surface layer of the present embodiment is a harder layer than the inner part. Herein, a state in which the surface layer is a harder layer than the inner part indicates that a power necessary for peeling off a thin layer is larger in the surface than in the inner part.

The components of the solid milk 10S are basically the same as components of the powdered milk as a raw material. The components of the solid milk 10S are, for example, fats, proteins, sugars, minerals, vitamins, moisture, and the like.

The powdered milk is produced from a liquid type milk (liquid milk) containing milk components (for example, components of a cow milk). The milk components are, for example, a raw milk (whole milk), a skimmed milk, cream, and the like. The moisture content ratio of the liquid milk is, for example, 40% by weight to 95% by weight. The moisture content ratio of the powdered milk is, for example, 1% by weight to 5% by weight. Nutritional components to be described below may be added to the powdered milk. The powdered milk may be a whole powdered milk, a powdered skimmed milk, or a creamy powder as long as it is suitable for producing the solid milk 10S. It is preferable that the content ratio of fat in the powdered milk is, for example, 5% by weight to 70% by weight.

The solid milk 10S of the present embodiment may contain emulsified fat and free fat as fats. The free fat is a fat which oozes from the powdered milk by the emulsification state being destroyed by the pressure. Since the powdered milk is an emulsion, in a case where the powdered milk is converted into a solid state by applying a pressure to the powdered milk, the free fat is caused by the emulsification state being destroyed by the pressure. This free fat is easily oxidized and spoils the taste of the powdered milk. In addition, there is a problem in that excessive free fat floats and agglutinates on the water surface when the powdered milk is dissolved in warm water (this phenomenon is called "oil-off"). The content ratio of free fat of the solid milk 10S is 0.5% by weight or more and 4% by weight or less and preferably 0.8% by weight or more and 1.2% by weight or less. The content ratio of free fat of the solid milk 10S is lower than that of a conventional solid milk. The conventional solid milk described herein refers to a solid milk obtained by performing a hardening treatment described below under conventional conditions.

The free fat can be measured as follows. First, the solid milk is finely ground with a cutter with attention not to grind the solid milk down entirely (grinding step). Thereafter, the ground solid milk is passed through a 32 mesh sieve (sieving step). The milk obtained through the sieving step is used as a sample, and the content ratio of free fat is measured according to the method described in "Determination of Free Fat on the Surface of Milk Powder Particles", Analytical Method for Dry Milk Products, A/S NIRO ATOMIZER (1978). The content ratio of free fat measured by this method is represented by % by weight of the fat extracted with an organic solvent (for example, n-hexane or carbon tetrachloride) under shaking at a constant speed for a constant time.

The milk components which are used as a raw material for the powdered milk are, for example, derived from a raw milk. Specifically, the milk components are derived from a raw milk of cows (Holstein cows, Jersey cows, and the like), goats, sheep, buffalos, and the like. Fat components are contained in the raw milk, but a milk in which a part or the whole of the fat components are removed by centrifugal separation or the like to adjust the content ratio of fat may be used.

The nutritional components which are used as a raw material for the powdered milk are, for example, fats, proteins, sugars, minerals, vitamins, and the like. One kind or two or more kinds of these may be added.

Proteins which may be used as a raw material for the powdered milk are, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins ($\alpha$-lactoalbumin, $\beta$-lactoglobulin, and the like), whey protein concentrate (WPC), whey protein isolate (WPI), and the like. Animal proteins are, for example, egg protein. Vegetable proteins are, for example, soybean protein and wheat protein. Examples of the amino acids include taurine, cystine, cysteine, arginine, and glutamine.

Fats (oils and fats) which may be used as a raw material for the powdered milk are animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Sugars which may be used as a raw material for the powdered milk are, for example, oligosaccharides, monosaccharides, polysaccharides, artificial sweeteners, and the like. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like. Incidentally, instead of or in addition to artificial sweeteners of sugars, non-sugar artificial sweeteners may be used.

Minerals which may be used as a raw material for the powdered milk are, for example, sodium, potassium, calcium, magnesium, iron, copper, zinc, and the like. One kind or two or more kinds of these may be added. Incidentally, instead of or in addition to sodium, potassium, calcium, magnesium, iron, copper, and zinc of minerals, either or both of phosphorus and chlorine may be used.

In the solid milk 10S, a large number of pores (for example, fine pores) generated when a powdered milk as a raw material for the solid milk 10S is compression molded exist. It is preferable that these plural pores are uniformly dispersed (distributed) into the solid milk 10S, and according to this, the solid milk 10S can be evenly dissolved, so that the solubility of the solid milk 10S can be enhanced. Herein, as the pore is larger (wider), a solvent such as water is easy to penetrate, so that the solid milk 10S can be rapidly dissolved. On the other hand, when the pore is too large, the hardness of the solid milk 10S may be reduced or the surface of the solid milk 10S may become coarse. The dimension (size) of each pore is, for example, 10 μm to 500 μm. Incidentally, the dimension (size) of each pore or the distribution of the large number of pores can be measured, for example, by a known means such as observation of the surface and cross-section of the solid milk 10S using a scanning electron microscope. By such measurement, the porosity of the solid milk 10S can be determined.

The porosity of the solid milk 10S is, for example, 30% to 60%. As the porosity is larger, the solubility is increased but the hardness (strength) is reduced. In addition, when the porosity is small, the solubility deteriorates. The porosity of the solid milk 10S is not limited within range of 30% to 60% and is appropriately adjusted depending on use applications thereof, or the like.

It is preferable that the solid milk 10S has a predetermined range of hardness. The hardness can be measured by a known method. In the present specification, the hardness is measured by using a load cell tablet hardness tester. The solid milk 10S having a rectangular parallelepiped shape is placed on the load cell tablet hardness tester while the second face 10B of the solid milk 10S is set to a bottom face, is fixed by using one face parallel to the XZ plane and one face parallel to the YZ plane of the lateral face 10C, and is pushed by a fracture terminal of the hardness tester at a constant speed from another face side, which is not fixed and is parallel to the XZ plane, of the lateral face 10C in a minor direction of the first face 10A (Y-axis direction in FIG. 1) toward a direction in which the YZ plane is fracture face, and a loading [N] when fracturing the solid milk 10S is regarded as a hardness (tablet hardness) [N] of the solid milk 10S. For example, a load cell tablet hardness tester (PORTABLE CHECKER PC-30) manufactured by OKADA SEIKO CO., LTD. is used. The fracture terminal built in the hardness tester has a contact face being in contact with the solid milk 10S. The contact face of the fracture terminal is a rectangle of 1 mm×24 mm and is disposed in a direction in which the long side of the rectangle is parallel to the Z axis. The contact face of the fracture terminal is configured to push a measurement point of the solid milk 10S in at least a part thereof. The speed of the fracture terminal pushing the solid milk 10S is set to 0.5 mm/s. The measurement of the hardness is not limited to the solid milk 10S and can also be applied to the case of measuring the hardness of a compression molded body of the powered milk (unhardened solid milk 10S) described below. Regarding the hardness measured as described above, in order to avoid the situation of solid milk 10S being fractured when the solid milk 10S is transported, etc. as much as possible, the hardness of the solid milk 10S is preferably 20 N or more and more preferably 40 N or more. On the other hand, since the solubility of the solid milk 10S deteriorates when the hardness of the solid milk 10S is too high, the hardness of the solid milk 10S is preferably 80 N or less and more preferably 70 N or less.

The hardness used herein is a physical quantity of power having a unit of [N (newton)]. The hardness increases as a fractured area of a solid milk sample becomes larger. Herein, the term "fracture" indicates that, when a vertical loading is statically applied to a sample such as the solid milk 10S, the sample is fractured, and a cross-sectional area generated when sample is fractured is referred to as a "fractured area". That is, the hardness [N] is a physical quantity dependent on the dimension of the solid milk sample. There is mentioned a fracture stress [N/m²] as a physical quantity not dependent on the dimension of the solid milk sample. The fracture stress is a power applied per unit fractured area at the time of the sample being fractured, is not dependent on the dimension of the solid milk sample, and is an index with which mechanical actions applied to solid milk samples can be compared even between solid milk samples having different dimensions. For example, in the case of the solid milk 10S, an ideal fractured area is represented by a dimension b×c that is the minimum fractured area of the solid milk and is expressed as "Fracture stress=Hardness/Fractured area". The description has been simply given using the hardness [N] in this specification, but the hardness may be represented as the fracture stress [N/m²] obtained by dividing the hardness by the fractured area. For example, in a case where the dimension of the schematic shape of the solid milk 10S is a rectangular parallelepiped shape of 31 mm (a)×24 mm (b)×12.5 mm (c), an ideal fractured area is 300 mm² (24 mm (b)×12.5 mm (c)). The preferred hardness range of the solid milk 10S that is 20 N or more and 100 N or less corresponds to a preferred fracture stress range that 0.067 N mm² or more and 0.3 N/mm² or less obtained by dividing the hardness by the fractured area (300 mm²).

(Solubility)

The solid milk 10S is required to have a certain degree of solubility to a solvent such as water. The solubility can be evaluated, for example, by a time for the solid milk 10S to completely dissolve or the amount of non-dissolved residues at a predetermined time when the solid milk 10S as a solute and water as a solvent are prepared to have a predetermined concentration.

The solid milk 10S is excellent in solubility as compared to a conventional solid milk. The solubility can be measured as follows. A sample is placed in a stirring basket and submerged in warm water at 50° C. The volume of warm water is set to 200 ml with respect to one sample. Incidentally, in a case where the weight per one sample is 4 to 6 g, the volume of warm water may be adjusted so that the solute concentration in the case of using the sample as solute is 1.96% by weight to 2.91% by weight. The stirring basket in which the sample is placed is rotated at a rotation speed of 0.5±0.002 m/s (peripheral speed) and the warm water is stirred. The dissolution process from the sample stating to dissolve until the sample completely dissolving is measured over time on the basis of electric conductivity. The obtained electric conductivity is converted into the dissolution ratio. A dissolution ratio at t seconds was defined as a ratio of electric conductivity when electric conductivity at the time of finish of dissolution is regarded as 100%. A time at which the dissolution ratio of the sample reaches n % was designated as n % dissolution time ($t_n$). The solubility at the initial stage of dissolution was designated as a 20% dissolution time ($t_{20}$), the solubility at the middle stage of dissolution was designated as a 63% dissolution time ($t_{63}$), and the solubility at the final stage of dissolution was designated as a 95% dissolution time ($t_{95}$). The solubility index ($I_d$) that is an evaluation index including information of dissolution times at the initial stage of dissolution, the middle stage of dissolution, and the final stage of dissolution can be represented by the following Formula (1), and a smaller solubility index indicates high solubility.

$$I_d = (t_{20}/t_{20ref} + t_{63}/t_{63ref} + t_{95}/t_{95ref})/3 \tag{1}$$

In the above Formula (1), $t_{20ref}$, $t_{63ref}$ and $t_{95ref}$ are a 20% dissolution time, a 63% dissolution time, and a 95% dissolution time of the reference solid milk, respectively, and are called reference values. The reference solid milk is a solid milk, which has been separately prepared in the same manner as the solid milk of the embodiment, except that conditions in a hardening treatment described below are different. Hardening treatment conditions for preparing a reference solid milk are different from the case of preparing the solid milk 10S in that the humidification treatment temperature is 100° C. or lower. The hardening treatment of forming reference solid milk may be further different from the case of preparing the solid milk 10S in drying treatment conditions. The condition that the humidification treatment temperature is 100° C. or lower is a known condition as described in PTL 2 described above. The reference solid milk is a conventional solid milk in terms of the humidification treatment conditions being known conditions. The weight, shape, and hardness of the reference solid milk used in the present embodiment are the same as those of the solid milk of the embodiment. Since the shapes are the same as each other, the surface area of the reference solid milk is the same as that of the solid milk of the embodiment. Components of the reference solid milk are the same as the components of the solid milk 10S. Alternatively, the compositions of at least fats, proteins, and sugars of the reference solid milk may be the same as those of the solid milk 10S.

The weight, surface area, and hardness of the reference solid milk are not limited to the case of being the same as those of the solid milk of the embodiment. The weight of the reference solid milk includes a case where a difference in weight from the solid milk of the embodiment is within ±0.3%. The surface area of the reference solid milk includes a case where a difference in surface area from the solid milk of the embodiment is within ±2%. The hardness of the reference solid milk includes a case where a difference in hardness from the solid milk of the embodiment is within ±4%. As long as differences in weight, surface area, and hardness of the reference solid milk with respect to the solid milk of the embodiment are within the above ranges, an appropriate reference value as a conventional solid milk can be obtained. The shape of the reference of the solid milk is selected according to the shape of the solid milk of the embodiment. For example, in a case where the shape of the solid milk of the embodiment is a round column shape, an elliptical column shape, a cubic shape, a plate shape, a polygonal column shape, a polygonal pyramid shape, or a polyhedron shape, the shape of the reference solid milk is set to a round column shape, an elliptical column shape, a cubic shape, a plate shape, a polygonal column shape, a polygonal pyramid shape, or a polyhedron shape.

The hardness is adjusted by three conditions of temperature, humidity, and time in a humidification treatment described below. In the humidification treatment in the case of preparing a reference solid milk, the ambient humidity is, for example, within a range of 60% RH to 100% RH, the humidification time is, for example, 5 seconds to 1 hour, and the temperature is, for example, 30° C. to 100° C. In the drying treatment in the case of preparing a reference solid milk, the humidity is, for example, 0% RH to 30% RH and the temperature is, for example, 20° C. to 150° C.

A plurality of (for example, ten) reference solid milks are prepared, the solubility of the plurality of reference solid milks is measured in the same manner as in the solid milk of the embodiment, and the obtained arithmetic average of dissolution times is used as reference values ($t_{20ref}$, $t_{63ref}$, and $t_{95ref}$).

The ratios ($t_{20}/t_{20ref}$, $t_{63}/t_{63ref}$, and $t_{95}/t_{95ref}$) of the dissolution times ($t_{20}$, $t_{63}$, and $t_{95}$) of the solid milk of the embodiment to the dissolution times ($t_{20ref}$, $t_{63ref}$, and $t_{95ref}$) of the reference solid milk for each of the dissolution ratios of 20%, 63%, and 95% are respectively designated as relative dissolution times ($Rt_{20}$, $Rt_{63}$, and $Rt_{95}$). The solubility index ($I_d$) represented by the above Formula (1) is an arithmetic average of the relative dissolution times ($Rt_{20}$, $Rt_{63}$, and $Rt_{95}$). In a case where the solubility of the reference solid milk different only in the hardening treatment conditions is set to 1, the solubility index ($I_d$) is an index for evaluating the solubility of the solid milk of the embodiment. In a case where the solubility index ($I_d$) is equal to 1 or larger than 1, it is shown that the solubility is the same as that of the reference solid milk or inferior to that of the reference solid milk. Since the solubility index ($I_d$) of the solid milk in the present embodiment is less than 1, the solid milk is excellent in solubility as compared to a conventional solid milk while having a hardness equal to the hardness of the conventional solid milk.

Regarding the above-described solubility index ($I_d$), the reasons why the solubility at the initial stage of dissolution is represented by a 20% dissolution time ($t_{20}$), the solubility at the middle stage of dissolution is represented by a 63% dissolution time ($t_{63}$), and the solubility the final stage of dissolution is represented by a 95% dissolution time ($t_{95}$) will be described below.

Figure 3:
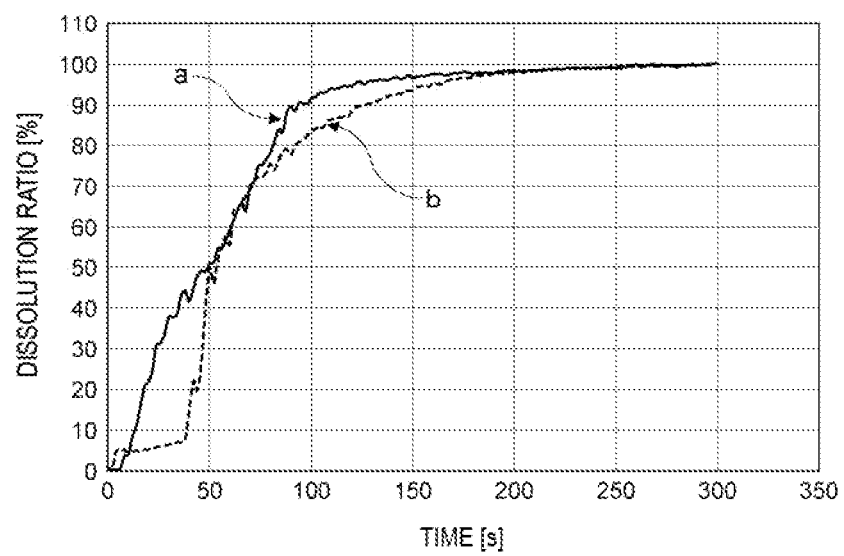
FIG. 3 is a graph showing a temporal change in dissolution ratio.

FIG. 3 is a graph showing a temporal change in dissolution ratio of solid milks a and b produced in different conditions. In the solid milk a, the dissolution ratio increases immediately after the start of dissolution. In the solid milk b, the dissolution ratio stagnates once after the initial dissolution and then the dissolution ratio increases again.

A general dissolution test of tablets (drugs) is performed by a time until the concentration reaches 85%, or comparing a time until the concentration reaches 60% and a time until the concentration reaches 85%. However, as shown in FIG. 3, depending on differences in the product type and the production conditions of solid milks, dissolution may stagnate at the initial stage or it may take a time to finish dissolution. Therefore, as for the solid milks, is not appropriate that the solubility is evaluated with one or two indices as in evaluating general tablets. In particular, prolongation of the dissolution time at the initial stage is a factor with which a user feels "hardly dissolved" in the sensory evaluation, and is important in evaluation of quality of solid milks.

In Formula (1) representing the solubility index ($I_d$) described above, the 20% dissolution time was used for evaluation of the solubility at the initial stage of dissolution, the 63% dissolution time was used for evaluation of the solubility at the middle stage of dissolution, and the 95% dissolution time was used for evaluation of the solubility at the final stage of dissolution. The 63% dissolution time indicating the solubility the middle stage of dissolution corresponds to a time constant τ in the general transient response and is widely known as a value indicating characteristics of responses in evaluation indices of response characteristics of various sensors. The 95% dissolution time indicating the solubility at the final stage of dissolution corresponds to an evaluation index indicating response characteristics in 3τ with respect to the time constant τ in theory. In Formula (1) representing the solubility index ($I_d$) described above, by determining an arithmetic average of the dissolution times at the initial stage, the middle stage, and the final stage of dissolution, the solubility index ($I_d$) is defined as a comprehensive index indicating dissolution characteristics.

(Method for Producing Solid Milk 10S)

Next, the method for producing the solid milk 10S will be described. First, a powdered milk which is used as a raw material for the solid milk 10S is produced. In a process of producing a powdered milk, a powdered milk is produced, for example, by liquid milk preparation step, a liquid milk clarification step, a sterilization step, a homogenization step, a condensation step, a gas dispersion step, and a spray drying step.

The liquid milk preparation step is a step of preparing a liquid milk of the above-described components.

The clarification step is a step for removing fine foreign matters contained in the liquid milk. In order to remove these foreign matters, for example, a centrifuge, a filter, and the like may be used.

The sterilization step is a step for killing microorganisms such as bacteria contained in water, milk components, or the like of the liquid milk. Since microorganisms, which are considered to be actually contained, are changed depending on the type of the liquid milk, sterilization conditions (a sterilization temperature and a retention time) are appropriately set according to the microorganisms.

The homogenization step is a step for homogenizing the liquid milk. Specifically, the particle diameter of solid components such as fat globules contained in the liquid milk is decreased, and these components are uniformly dispersed into the liquid milk. In order to decrease the particle diameter of solid components of the liquid milk, for example, liquid milk may be caused to pass through a narrow gap while being pressurized.

The condensation step is a step for condensing the liquid milk before the spray drying step to be described below. In condensation of the liquid milk, fox example, a vacuum evaporator or an evaporator may be used. Condensation conditions are appropriately set within a range that components of the liquid milk are not excessively altered. According to this, a condensed milk can be obtained from the liquid milk. In the present embodiment, it is preferable that a gas is dispersed into the condensed liquid milk (condensed milk) and then spray drying is performed. In this case, the moisture content ratio of the condensed milk is, for example, 35% by weight to 60% by weight, and is preferably 40% by weight to 60% by weight and more preferably 40% by weight to 55% by weight. When such a condensed milk is used and a gas is dispersed, decreasing the density of the liquid milk (condensed milk) makes the condensed milk bulky, and the condensed milk in a bulky state in this way is sprayed and dried, so that a powdered milk having preferable characteristics when a solid milk is produced can be obtained. Incidentally, in a case where the moisture of the liquid milk is small or the treated amount of the liquid milk to be subjected to the spray drying step is small, this step may be omitted.

The gas dispersion step is a step for dispersing a predetermined gas into the liquid milk (condensed milk). In this case, an example of the predetermined gas includes a gas dispersed with a volume of $1\times10^{-2}$ times or more and 7 times or less the volume of the liquid milk, and the volume thereof is preferably $1\times10^{-2}$ times or more and 5 times or less the volume of the liquid milk, more preferably $1\times10^{-2}$ times or more and 4 times or less the volume of the liquid milk, and most preferably $1\times10^{-2}$ times or more and 3 times or less.

The predetermined gas is preferably pressured in order to disperse the predetermined gas into the liquid milk. The pressure for pressurizing the predetermined gas is not particularly limited as long as it is within a range enabling the gas to effectively disperse into the liquid milk, but the atmospheric pressure of the predetermined gas is, for example, 1.5 atm or more and 10 atm or less and preferably 2 atm or more and 5 atm or less. Since the liquid milk is sprayed in the following spray drying step, the liquid milk flows along a predetermined flow passage, and in this gas dispersion step, by running the predetermined gas pressurized into this flow passage, the gas is dispersed (mixed) into the liquid milk. By doing so, the predetermined gas can be easily and certainly dispersed into the liquid milk.

As described above, through the gas dispersion step, the density of the liquid milk (condensed milk) is decreased, and the apparent volume (bulk) is increased. Incidentally, the density of the liquid milk may be obtained by dividing the weight of the liquid milk by the total volume of the liquid milk at a liquid state and a bubble state. In addition, the density of the liquid milk may be measured using an apparatus measuring a density according to the bulk density measurement (pigment: JIS K 5101 compliant) based on JIS method.

Therefore, the liquid milk in a state where the predetermined gas is dispersed flows in the flow passage. Herein, the volume flow rate of the liquid milk in the flow passage is preferably controlled to be constant.

In the present embodiment, carbon dioxide (carbon dioxide gas) can be used as the predetermined gas. In the flow passage, the ratio of the volume flow rate of carbon dioxide to the volume flow rate of the liquid milk (hereinafter, the percentage thereof is also referred to as "$CO_2$ mixing ratio [%]") is, for example, 1% or more and 700% or less, preferably 2% or more and 300% or less, more preferably 3% or more and 100% or less, and most preferably 5% or more and 45% or less. As described above, by controlling the volume flow rate of the carbon dioxide to be constant to the volume flow rate of the liquid milk, homogeneousness of the powdered milk produces from this liquid milk can be enhanced. However, when the $CO_2$ mixing ratio is too large, the percentage of the liquid milk flowing in the flow passage is decreased so that production efficiency of the powdered milk deteriorates. Therefore, the upper limit of the $CO_2$ mixing ratio is preferably 700%. In addition, the pressure for pressurizing the carbon dioxide is not particularly limited as long as it is within a range enabling the carbon dioxide to effectively disperse into the liquid milk, but the atmospheric pressure of the carbon dioxide is, for example, 1.5 atm or more and 10 atm or less and preferably 2 atm or more and 5 atm or less. Incidentally, by mixing continuously (in-line mixing) carbon dioxide and the liquid milk in a seal-up system, it is possible to certainly prevent bacteria or the like from being mixed so that the hygienic status of the powdered milk can be enhanced (or high cleanliness can be maintained).

In the present embodiment, the predetermined gas used in gas dispersion step was carbon dioxide gas. Instead of carbon dioxide gas or with carbon dioxide gas, one or two or more gases selected from the group consisting of air, nitrogen ($N_2$), and oxygen ($O_2$) may be used or rare gas (for example, argon (Ar) or helium (He)) may be used. As described above, since various gases can be options, the gas dispersion step be easily performed by using a gas easily available. In the gas dispersion step, when an inert gas such as nitrogen or rare gas is used, there is no possibility to react with nutritional components of the liquid milk or the like, and thus, it is preferable rather than using air or oxygen since there is less possibility to deteriorate the liquid milk. In this case, the ratio of the volume flow rate of the gas to the volume flow rate of the liquid milk is, for example, 1% or more and 700% or less, preferably 1% or more and 500% or less, more preferably 1% or more and 400% or less, and most preferably 1% or more and 300% or less. For example, according to Bell et al, (R. W. BELL, F. P. HANRAHAN, B. H. WEBB: "FOAM SPRAY METHODS OF READILY DISPERSIBLE NONFAT DRY MILK", J. Dairy Sci, 46 (12) 1963. pp. 1352-1356), air having about 18.7 times the volume of non-fat milk is dispersed into non-fat milk to obtain a powdered skimmed milk. In the present embodiment, by dispersing the gas within the above range, a powdered milk having characteristics preferable for producing a solid milk can be obtained. However, to certainly decrease the density of the liquid milk as a result of having dispersed the predetermined gas into a liquid milk in the gas dispersion step, it is preferable to use, as the predetermined gas, a gas which is easily dispersed into the liquid milk or a gas which is easily dissolved in the liquid milk. Therefore, a gas having a high degree of solubility in water (water solubility) is preferably used, and a gas in which a degree of solubility at 20° C. in 1 cm$^3$ of water is 0.1 cm$^3$ or more is preferred. Incidentally, carbon dioxide is not limited to a gas and may be dry ice or a mixture of dry ice and a gas. That is, in the gas dispersion step, a solid may be used as long as a predetermined gas can be dispersed into the liquid milk. In the gas dispersion step, carbon dioxide can be rapidly dispersed into the liquid milk in a cooling state by using dry ice, and as a result, a powdered milk having characteristics preferable for producing a solid milk can be obtained.

The spray drying step is a step for obtaining a powdered milk (powder) by evaporating moisture in the liquid milk. The powdered milk obtained in this spray drying step is a powdered milk obtained through the gas dispersion step and spray drying step. This powdered milk is bulky as compared to a powdered milk obtained not through the gas dispersion step. The volume of the former is preferably 1.01 times or more and 10 times or less that of the latter, may be 1.02 times or more and 10 times or less or 1.03 times or more and 9 times or less.

In the spray drying step, the liquid milk is spray dried in a state where the predetermined gas is dispersed into the liquid milk in the gas dispersion step and the density of the liquid milk becomes small. Specifically, it is preferable to spray dry the liquid milk in a state where the volume of the liquid milk after dispersing a gas is 1.05 times or more and 3 times or less, preferably 1.1 times or more and 1 times or less as compared to the volume of the liquid milk before dispersing a gas. That is, in the spray drying step, spray drying is performed after finishing the gas dispersion step. However, immediately after finishing the gas dispersion step, the liquid milk is not homogeneous. Therefore, the spray drying step performed for 0.1 seconds or longer and 5 seconds or shorter, preferably, 0.5 seconds or longer and 3 seconds or shorter after finishing the gas dispersion step. That is, it is sufficient that the gas dispersion step and the spray drying step are continuously performed. By doing so, the liquid milk is continuously placed in a gas dispersion apparatus to disperse a gas, and the liquid milk into which the gas is dispersed is continuously supplied to a spray drying apparatus and can be continuously spray dried.

In order to evaporate moisture, a spray dryer may be used. Herein, the spray dryer includes a flow passage for flowing a liquid milk, a pressuring pump pressuring the liquid milk for flowing the liquid milk along the flow passage, a dry chamber having a wider room than that of the flow passage connecting to an opening of the flow passage, and a spraying apparatus (a nozzle, an atomizer, or the like) set at the opening of the flow passage. Further, the spray dryer transfers the liquid milk by the pressuring pump toward the dry chamber along the flow passage to be the above volume flow rate, the condensed milk is diffused by the spray apparatus inside the chamber in the vicinity of the opening of the flow passage, and the liquid milk in a liquid drop (atomization) state is dried inside the dry chamber at a high temperature (for example, hot wind). That is, moisture is removed by drying the liquid milk in the chamber, and as a result, the condensed milk becomes a solid of a powder state, namely, a powdered milk. Incidentally, the moisture amount or the like in the powdered milk is adjusted by appropriately setting the drying condition in the drying chamber, so that it makes the powdered milk less likely to cohere. In addition, by using the spraying apparatus, the surface area per unit volume of liquid drop is increased so that drying efficiency is enhanced, and at the same time, the particle diameter or the like of the powdered milk is adjusted.

Through the steps as described above, a powdered milk suitable for producing a solid milk can be produced.

The powdered milk obtained as described above is compression molded to mold a compression molded body of the powdered milk. Next, the obtained compression molded body of the powdered milk is subjected to a hardening treatment including a humidification treatment and a drying treatment. As described above, the solid milk 10S can be produced.

In the step of compression molding the powdered milk, a compression means is used. The compression means is, for example, a pressurization molding machine such as a tablet press or a compression testing apparatus. The tablet press includes a die serving as a mold in which a powdered milk (powder) is input and a punch capable of punching to the die. When a powdered milk is input in the die (mold) and punched by the punch, a compression pressure is applied to the powdered milk so that a compression molded body of the powdered milk can be obtained. Incidentally, in the compression molding step, it is preferable to continuously perform the compression operation of the powdered milk.

In the step of compression molding the powdered milk, the ambient temperature is not particularly limited, and may be, for example, room temperature. Specifically, the ambient temperature is, for example, 5° C. to 35° C. The ambient humidity is, for example, 0% RH to 60% RH. The compression pressure is, for example, 1 MPa to 30 MPa, and preferably 1 MPa to 20 MPa. In particular, when the powdered milk is solidified, it is preferable that the porosity is controlled within a range of 30% to 60% and the hardness of the compression molded body the powdered milk (before hardening) is controlled within a range of 4 N to 19 N by adjusting the compression pressure within a range of 1 MPa to 30 MPa. According to this, it is possible to produce a high utility solid milk 10S having both solubility and convenience (easy handleability). Incidentally, the compression molded body of the powdered milk has such a hardness (for example, 4 N or more) that the shape of the compression molded body of the powdered milk is not collapsed in at least the subsequent humidification step and drying step. For example, in a case where the dimension of the schematic shape of the compression molded body of the powdered milk (before hardening) is the same rectangular parallelepiped shape of 31 mm (a)×24 mm (b)×12.5 (c) as that of the solid milk 10S, the preferred hardness range of the compression molded body of the powdered milk (before hardening) that is 4 N or more and 19 N or less corresponds to a preferred fracture stress that is 0.013 N/mm$^2$ or more and 0.063 N/mm$^2$ or less by dividing the hardness by the fractured area (300 mm$^2$).

The humidification treatment is a step of subjecting the compression molded body of the powdered milk obtained by the compression molding step to the humidification treatment. When the compression molded body of the powdered milk is humidified, tackiness is generated on the surface of the compression molded body of the powdered milk. As a result, some of the powder particles in the vicinity of the surface of the compression molded body of the powdered milk become a liquid or a gel and are cross-linked to each other. Then, by performing drying in this state, the strength in the vicinity of the surface of the compression molded body of the powdered milk can be increased as compared to the strength of the inner part. The degree of cross-linking (degree of broadening) is adjusted by adjusting time at which the compression molded body of the powdered milk is put under a high-humidity environment (humidification time), and according to this, the hardness (for example, 4 N to 19 N) of the compression molded body of the powdered milk before the humidification step (unhardened solid milk 10S) can be increased to a target hardness (for example, 40 N) necessary as the solid milk 10S. However, the range (width) of the hardness that can be increased by adjusting the humidification time is limited. That is, when the compression molded body of the powdered milk is transported by a belt conveyer or the like to humidify the compression molded body of the powdered milk obtained after the compression molding, if the hardness of the compression molded body of the powdered milk is not sufficient, the shape of the solid milk 10S is not kept. In addition, if the hardness of the compression molded body of powdered milk is too high during the compression molding, only the solid milk 10S having a small porosity and poor solubility is obtainable. Therefore, preferable to perform the compression molding so that the hardness of the compression molded body of the powdered milk before the humidification step (unhardened solid milk 10S) is sufficiently high and the solubility of the solid milk 10S is sufficiently kept.

In the humidification treatment, a humidification method of the compression molded body of the powdered milk is not particularly limited, and for example, a method of placing a compression molded body of the powdered milk under a high-humidity environment, a method of directly spraying water or the like to a compression molded body of the powdered milk, a method of blowing steam to a compression molded body of the powdered milk, and the like are mentioned. Examples of humidification means to humidify the compression molded body of the powdered milk include a high-humidity chamber, a sprayer, and steam.

In a case where the compression molded body of the powdered milk is placed under a high-humidity environment, the compression molded body of the powdered milk is placed under an environment of a relative humidity of 100% RH or less and a temperature of higher than 100° C. In a case where the compression molded body of the powdered milk is placed under a high-humidity environment, the temperature is preferably 330° C. or lower, more preferably 110° C. or higher and 280° C. or lower, further preferably 120° C. or higher and 240° C. or lower, and most preferably 130° C. or higher and 210° C. or lower. In a case where the compression molded body of the powdered milk is placed under a high-humidity environment, the relative humidity is preferably 0.1% RH or more and 20% RH or less, more preferably 1% RH or more and 15% RH or less, further preferably 1.5% RH or more and 12% RH or less, and most preferably 2% RH or more and 10% RH or less. In a case where the compression molded body of the powdered milk is placed under a high-humidity environment, the treatment time is not particular restricted, and is, for example, 0.1 seconds or longer and 30 seconds or shorter, preferably 4.4 seconds or longer and 20 seconds or shorter, more preferably 4.4 seconds or longer and 12 seconds or shorter, and further preferably 5 seconds or longer and 10 seconds or shorter. In the humidification conditions, there are temperature, humidity, and time, as the temperature is higher, the humidity is higher, and the time is longer, the humidification effect is enhanced, and as the temperature is lower, the humidity is lower, and the time is shorter, the humidification effect is weakened.

The reason why the temperature environment is set to higher than 100° C. in the embodiment will be described. As described in PTL 2 described above, a conventional humidification and drying method uses humidified air at 100° C. or lower. The reason for this is that since the temperature of saturated water vapor under normal pressure (atmospheric pressure) is 100° C., the temperature of water vapor under normal pressure is 100° C. or lower unless a specific operation is performed. Considering actual production, a treatment in an airtight pressure container is necessary in order to create a high-pressure environment that is not normal pressure, production efficiency is decreased due to a batch treatment or the like, and thus it is desirable that the treatment can be continuously performed under a normal-pressure environment.

On the other hand, in drying techniques in recent years, superheated water vapor drying using "superheated water vapor" obtained by further heating the generated water vapor to a temperature higher than a boiling point (higher than 100° C. under normal pressure) by a heater or the like is also used. The superheated water vapor is used since the drying efficiency using thermal energy thereof is high, but in the present embodiment, this superheated water vapor is used in the humidification step. According to this, humidified air of higher than 100° C. in which humidity is controlled even under normal pressure (101° C. or higher in the meaning of being controlled) can be used. Specifically, the humidity can be adjusted by adjusting the amount of water vapor to be generated (to be charged), and the temperature can be adjusted the heat quantity of the heater. In an actual humidification step, the hardness is adjusted by three conditions of temperature, humidity, and time.

The moisture amount (hereinafter, also referred to as "amount of humidification") to be added to the compression molded body of the powdered milk in the humidification treatment according to the embodiment can be appropriately adjusted. The amount of humidification is preferably 0.5% by weight to 3% by weight of the mass of the compression molded body of the powdered milk obtained after the compression molding step. When the amount of humidification is less than 0.5% by weight, it is not possible to provide a sufficient hardness (tablet hardness) to the solid milk 10S, which is not preferred. In addition, when the amount of humidification is more than 3% by weight, the compression molded body of the powdered milk is excessively dissolved into a liquid state or a gelled state so that the compression molded body of the powdered milk is deformed from the compression molded shape or is attached to an apparatus such as a belt conveyer during transporting, which is not preferable.

The drying treatment is a step for drying the compression molded body of the powdered milk humidified in the humidification treatment. According to this, surface tackiness on the compression molded body of the powdered milk is eliminated so that the solid milk 10S is easily handled. That is, the humidification treatment and the drying treatment correspond to a step of providing desired characteristics or quality as the solid milk 10S by increasing the hardness of the compression molded body of the powdered milk obtained after compression molding.

In the drying treatment, a drying method of the compression molded body of the powdered milk is not particularly limited, and a known method capable of drying the compression molded body of the powdered milk obtained through the humidification treatment can be employed. For example, a method of placing the compression molded body of the powdered milk under a low-humidity and high-temperature condition, a method of bringing the compression molded body of the powdered milk into contact with dry air or high-temperature dry air, and the like are mentioned.

In a case where the compression molded body of the powdered milk is placed under a low-humidity and high-temperature environment, the compression molded body of the powdered milk is placed under an environment of a relative humidity of 0% RH or more and 30% RH or less and a temperature of 80° C. or higher and 330° C. or lower. The temperature in the case where the compression molded body of the powdered milk is placed under the low humidity and high-temperature environment is, for example, 330° C. The treatment time in the case where the compression molded body of the powdered milk is placed under the low-humidity and high-temperature environment is not particular restricted, and is, for example, 0.1 seconds or longer and 100 seconds or shorter.

Incidentally, the humidification treatment and the drying treatment can be performed as separate steps under conditions in which the temperatures or humidities are difference from each other as described above, and in this case, the humidification treatment and the drying treatment can be continuously performed. In addition, the humidification treatment and the drying treatment can also be performed under the same temperature and humidity environment, and in this case, humidification and drying can be performed at the same time. For example, compression molded body of the powdered milk is placed under a first temperature and humidity environment in which humidification and drying are performed at the same time, and subsequently, the compression molded body of the powdered milk is placed under a second temperature and humidity environment in which drying is only performed. The transition from the first temperature and humidity to the second temperature and humidity is a period of transition from a state where the humidification and drying of the compression molded body of the powdered milk are performed at the same time to a state where the drying of the compression molded body of the powdered milk is only performed.

When the moisture contained in solid milk 10S is large, storage stability deteriorates and it is easy for deterioration in the flavor and the discoloration of appearance to progress. Therefore, in the drying step, the moisture content ratio of the solid milk 10S is preferably controlled (adjusted) to be no more than 1% higher or lower than the moisture content ratio of powdered milk used as a raw material by controlling the conditions such as drying temperature and a drying time.

The solid milk 10S produced in this way is generally dissolved in warm water and drunk. Specifically, warm water is poured into a container or the like provided with a lid and then the necessary number of pieces of the solid milk 10S are placed therein, or the warm water is poured after the pieces of the solid milk 10S are placed. Then, preferably, the solid milk 10S is rapidly dissolved by lightly shaking the container and drunk in a state with an appropriate temperature. Further, when, preferably, one to several pieces of the solid milk 10S more preferably one piece of the solid milk 10S) are dissolved in warm water, the volume of the solid milk 10S may be adjusted to be a necessary amount of the liquid milk for one drinking, for example, to be 1 cm$^3$ to 50 cm$^3$. Incidentally, by changing the amount of the powdered milk used in the compression molding step, the volume of the solid milk 10S can be adjusted.

(Action and Effect of Method for Producing Solid Milk 10S)

In the method for producing solid milk 10S of the present embodiment, a solid milk having a solubility index ($I_d$) represented by the above Formula (1) of less than 1 can be produced. That is, a solid milk excellent in solubility while having the same hardness as that of a conventional solid milk can be produced. It is considered that the solubility of the produced solid milk 10S is improved by setting the humidification treatment condition in hardening to higher an 100° C. The solid milk 10S has suitable solubility and easily handled strength so that convenience can be further improved. Since the content ratio of free fat of the solid milk 10S is lower than that of a conventional solid milk, oxidation can be further suppressed.

The reason why solubility is improved by setting the humidification treatment condition for hardening to be higher than 100° C. is considered that, when the hardening treatment in which the humidification treatment condition is set to be higher than 100° C. is performed, a cross-linked structure generated by some of powder particles being a liquid or a gel by humidification is a structure having further higher solubility than a cross-linked structure generated by a conventional method in which the humidification treatment is performed at 100° C. or lower. More specifically, some of powder particles in the vicinity of the surface of the compression molded body of the powdered milk are softened by humidification at higher than 100° C., sugars become a non-crystalline rubber state, the sugars are cross-linked to each other at a contact point of particles adjacent to each other as a base point and then dried so as to be vitrified (solidified at a non-crystalline state) etc., and thus a structure having further higher solubility is obtained.

Application Example

Each of the embodiments described above is the solid milk obtained by compression molding the powdered milk, but can also at be applied to a solid food formed by compression molding powder. For example, the embodiment described above can be applied to solid foods obtained by using, as raw materials, protein powders such as whey protein, soybean protein, and collagen peptide, amino acid powders, oil and fat-containing powders such as MCT oil, and the like and compression molding the powders. Since the solid food according to the application example has a solubility index ($I_d$) represented by the above Formula (1) of less than 1, the solid food is excellent in solubility while having a hardness equal to that of a conventional solid food. Incidentally, the reference values $t_{20ref}$, $t_{63ref}$, and $t_{95ref}$ in the above Formula (1) in this case are regarded as times (sec) at which a dissolution ratio of a reference solid food, which is formed by performing the hardening treatment under conditions different from those of the solid food of the embodiment, reaches 20%, 63%, and 95%. In addition, other than milk sugar or other sugars, nutritional components such as fats, proteins, minerals, and vitamins or food additives may be added to the powder of the raw material. Components of the reference solid food are the same as the components of solid food.

Modified Example

Figure 2:
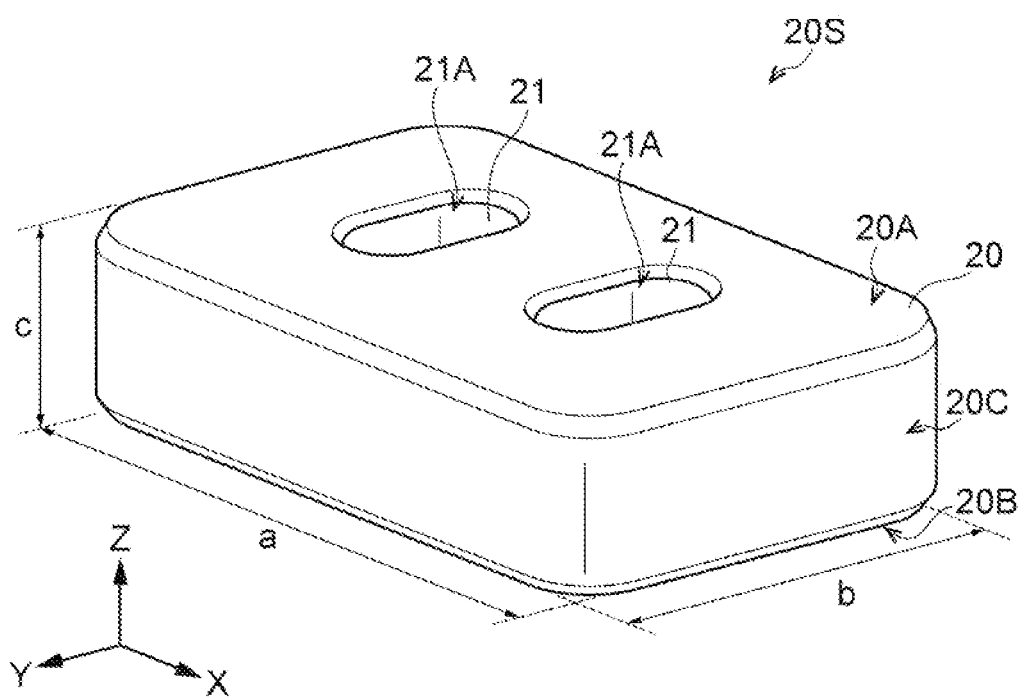
FIG. 2 is a perspective view of a solid milk according to Modified Example.

FIG. 2 is a perspective view of a solid milk 20S according to the present modified example. The solid milk 20S has a body 20 having a solid form obtained by compression molding a powdered milk. The body 20 has a first face 20A that is flat and parallel to an XY plane and a second face 20B that is flat and parallel to the XY plane. The first face 20A and the second face 20B are faces back on to each other. The schematic shape of the body 20 is a rectangular parallelepiped shape, and the body 20 has a lateral face 20C parallel to an XZ plane or an YZ plane.

Two holes 21 penetrating the body 20 from the first face 20A to reach to the second face 20B are provided in the body 20. The shapes of the two holes 21 are an oval shape in the cross-section parallel to the XY plane and are the same. The sizes of the two holes 21 are selected so that a volume obtained by subtracting the total volume of the portions of the two holes 21 from the volume of the rectangular parallelepiped shape of the body 20 becomes a predetermined value.

The position of the two holes 21 is a position without significant unevenness when viewed from the central position of the face 20A. The two holes 21 are arranged in a direction parallel to the X axis with the center part of the first face 20A interposed therebetween and are disposed so that a longitudinal direction of each of the holes 21 becomes a direction parallel to the Y axis. This is an arrangement that the two holes 21 are point-symmetric with respect to the center of the first face 20A or are line-symmetric with respect to a line parallel to the X axis passing through the center of the first face 20A or a line parallel to the Y axis. The interval between the two holes 21 is secured to be equal to or more than a predetermined value since a strength of the portion at the interval may not be maintained when the interval is too narrow. The same applies when the holes 21 are viewed from the second face 20B. A direction in which the holes 21 penetrate the body 20 is a direction passing through the first face 20A and second face 20B, and is, for example, a direction substantially parallel to the Z axis.

The solid milk 20S can be produced by the same procedures as those of the production method of the present embodiment, except a step of compression molding the powdered milk. In the step of compression molding the powdered milk, for example, a lower punch of the tablet press has a projection part corresponding to the hole 21, an upper punch has a recess part corresponding to the projection part, and the projection part has such a shape that the projection part is insertable into the recess part. By performing the compression molding using such a punch, the hole 21 can be formed in the compression molded body of the powdered milk.

Since the solid milk 20S of this Modified Example has two holes 21, a reference solid milk is also formed to have two holes 21. That is, the reference solid milk is a solid milk having the same shape as that of the solid milk 20S having two holes 21, which has been separately prepared, similarly to the solid milk 20S of Modified Example, except that conditions in the hardening treatment are different. The reference solid milk is formed to be the same as the solid milk 20S, except that the hardening treatment is different from that of the solid milk 20S, so that the above Formula (1) can be applied to the solid milk 20S. Therefore, since the solubility index ($I_d$) of the solid milk 20S is less than 1, it is possible to obtain the same effect as that of the present embodiment that the solid milk is excellent in solubility as compared to a conventional solid milk while having a hardness equal to the hardness of the conventional solid milk.

The hole provided in the solid milk 20S is not limited to the case of two holes, and the number of holes may be, for example, one, four, or six.

First Example

Preparation of Example

A solid milk sample similar to that in Modified Example shown in FIG. 2 was prepared and used as Example. Regarding the size of the body of the solid milk, the side a in the X-axis direction is 31 mm, the side b in the Y-axis direction is 24 mm, and the side c in the Z-axis direction is 12.5 mm. The solid milk sample has a surface area of 2780 ($mm^3$), a weight of 5.4 (g), and a volume excluding a portion of the hole 21 of about 8250 $mm^3$. The sizes of the die and the punch of the tablet press and the compression pressure were adjusted to obtain the above-described size, and compression molding was performed to mold a compression molded body of the powdered milk. The conditions when the compression molded body of powdered milk was molded were set to be the same in all samples. The humidification treatment temperature was set to 130° C. to 330° C., the humidity was set to 0.1% to 20%, and the treatment time was set to 5 seconds to 10 seconds. The drying treatment temperature was set to 330° C. and the treatment time was set to 5 seconds to 10 seconds. The hardness of Example thus prepared was 49 N to 52 N. As described above, all of the solid milks according to Example had an easily handle hardness.

Preparation of Comparative Example

A solid milk sample was prepared in the same manner as that of Example, except that the conditions of the hardening treatment were different, and the prepared solid milk sample was used as Comparative Example. In Comparative Example, the humidification treatment temperature was set to 80° C., the humidity was set to 60% RH, and the treatment time was set to 10 seconds. The drying treatment temperature was set to 80° C. and the treatment time was set to 360 seconds. The hardness of Comparative Example thus prepared was 51 N.

(Solubility Test)

In order to perform evaluation of the solubility by the hardening conditions, solubility test was performed on the solid milk samples of Examples and Comparative Example prepared as described above. First, one solid milk sample was put in a stirring basket. The stirring basket is a bottomed tubular container with a lid which has an inner diameter of 30 mm and a height of 36 mm, and has lateral part, a bottom part, and a lid part. The lateral part, the bottom part, and the lid part are formed with a stainless steel net having 18 meshes (opening: 1.01 mm). Four blade are evenly provided in the inner face of the lateral part of the stirring basket. Each of the four blades is a plate having a thickness of 1.5 mm, a width of 4 mm, and length of 34 mm, is disposed so that the longitudinal direction becomes parallel to the central axis of stirring basket, and is provided to protrude from the inner face of the lateral part toward the center thereof. In a state where the stirring basket was immersed in 200 ml of warm water (50±1° C.) contained in a 300 ml beaker so that the solid milk sample was completely submerged in water, the stirring basket was rotated at a rotation speed of 0.5 m/s (peripheral speed). The stirring basket was held at a height of 5 mm from the inner face of the beaker bottom part. The dissolution process from the solid milk sample starting to dissolve until the solid milk sample completely dissolving was measured at certain time intervals on the basis of electric conductivity.

Three samples of each of Examples and Comparative Example were subjected to the test, and each of 20% dissolution time ($t_{20}$), 63% dissolution time ($t_{63}$), and 95% dissolution time ($t_{95}$) was obtained from the average value of the three samples. The 20% dissolution time, the 63% dissolution time, and the 95% dissolution time of Comparative Example were respectively designated as reference values ($t_{20ref}$, $t_{63ref}$, and $t_{95ref}$), and the solubility index ($I_d$) was calculated on the basis of the above Formula (1). The 20% dissolution time ($t_{20ref}$), the 63% dissolution time ($t_{63ref}$), and the 95% dissolution time ($t_{95ref}$) of Comparative Example were 14 (sec), 32 (sec), and 93 (sec), respectively.

Figure 4:
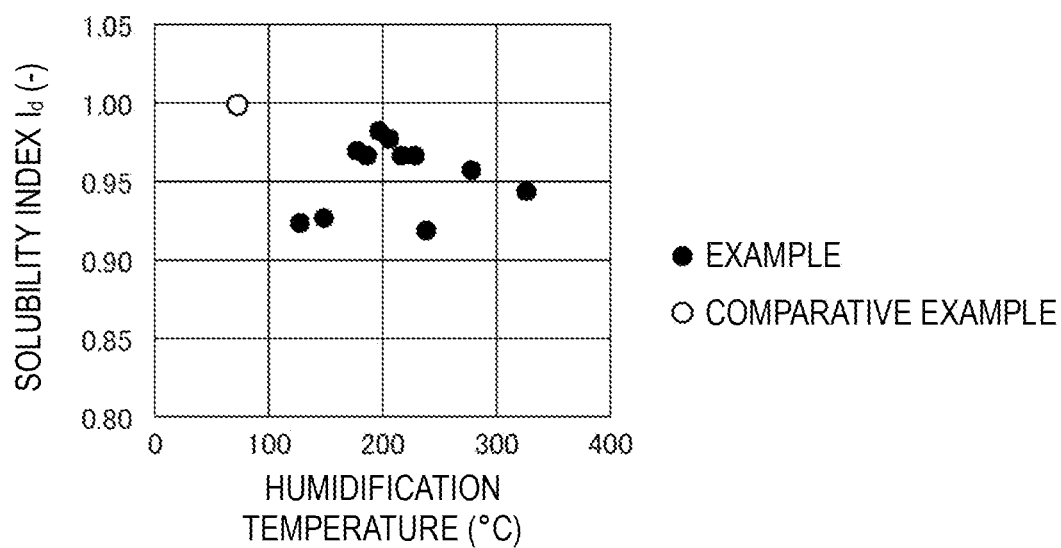
FIG. 4 is a graph showing results obtained by evaluating solubility.

The results are illustrated in FIG. 4. The vertical axis of FIG. 4 indicates a solubility index ($I_d$) and the horizontal axis indicates a humidification temperature. FIG. 4 is a graph showing a solubility index ($I_d$) with respect to a humidification temperature. In FIG. 4, a solid black circle indicates Example and an outlined circle indicates Comparative Example.

It was confirmed that in all Examples in FIG. 4, the solubility index ($I_d$) is less than 1.00 and is lower than that of Comparative Example. The reason for this is considered that solubility is improved by a difference in hardening treatment conditions, specifically, by setting the humidification treatment temperature condition to higher than 100° C., setting the drying temperature to higher than that in Comparative Example, and shortening the treatment time.

(Free Fat Measurement Test)

Figure 5:
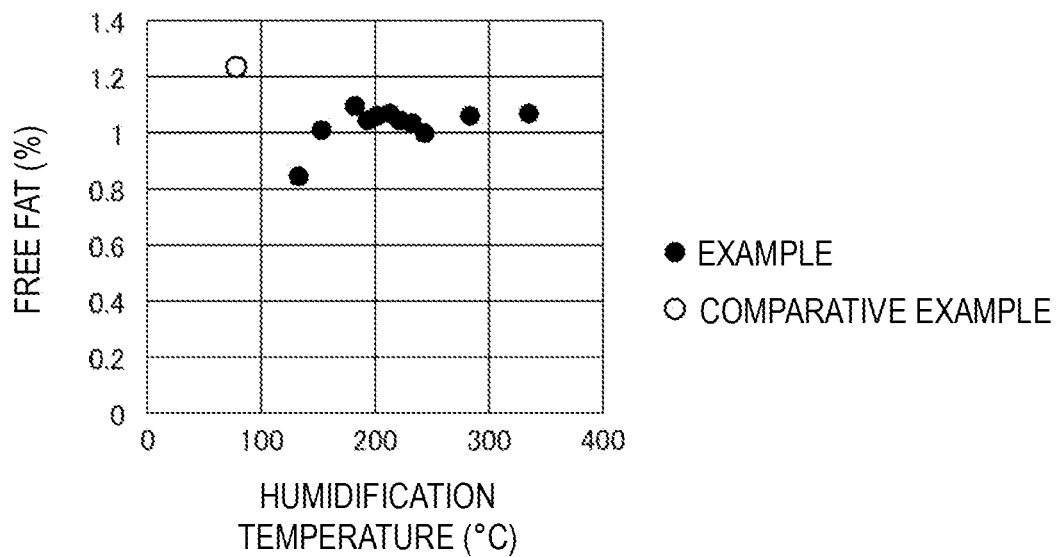
FIG. 5 is a graph showing results obtained by measuring a content ratio of free fat.

In order to perform evaluation of the content ratio of free fat by the hardening conditions, the content ratio of free fat was measured for the solid milk sample of each of Examples and Comparative Example prepared as described above. First, the solid milk was finely ground with a cutter with attention not to grind the solid milk down entirely. Thereafter, the ground solid milk was passed through a 32 mesh sieve. The milk obtained through the sieving step was used as a sample, and the content ratio of free fat was measured according to the method described in "Determination of Free Fat on the Surface of Milk Powder Particles", Analytical Method for Dry Milk Products, A/S NIRO ATOMIZER (1978). However, in the method for dissolving a solid milk (Niro Atomizer, 1978), the solvent for extraction was changed from carbon tetrachloride to n-hexane, and the extraction operation was changed depending on the change of the solvent. Incidentally, it is confirmed in "Investigation of measuring free fat in powdered milk", Shibata Mitsuho, Hatsumi Hama, Masami Imai, and Ikura Toyoda, Nihon Shokuhin Kagaku Kougaku Kaishi Vol. 53, No. 10, 551 to 554 (2006) that the measurement results of the free fat do not change even if the solvent and the extraction operation are changed. The results are illustrated in FIG. 5. The vertical axis of FIG. 5 indicates free fat and the horizontal axis indicates a humidification temperature. FIG. 5 is a graph showing a content ratio of free fat with respect to a humidification temperature. The content ratio of free fat is an average value of two samples. In FIG. 5, a solid black circle indicates Example and an outlined circle indicates Comparative Example.

It was confirmed that in all samples of Example in FIG. 5, the content ratio of free fat is lower than that of Comparative Example. The reason for this is considered that the content ratio of free fat is reduced by a difference in hardening treatment conditions, specifically, by setting the humidification treatment temperature condition to higher than 100° C., setting the drying temperature to higher than that in Comparative Example, and shortening the treatment time.

Second Example

A solid milk for the example was prepared in the same manner as that of First Example. The humidification treatment temperature was set from over 100° C. to 0° C., the relative humidity was set from 2% (2% RH) to 20% (20% RH), and the treatment time was set from 0.1 seconds to 30 seconds. The drying treatment temperature was set from over 100° C. to 330° C., and the treatment time was set from 5 seconds to 20 seconds. The hardness of Example thus prepared was ranged from 49 N to 52 N (the fracture stress at 50 N was 0.167 N/mm$^2$), all of which were easy to handle. A solubility test was performed for the prepared solid milk against the comparative example described in First Example in the same manner as that of First Example and it was confirmed that the solubility index ($I_d$) is less than 1.00 and is lower than that of comparative example. In addition, free fat measurement test was performed for prepared solid milk in the same manner as that of First Example and it was confirmed that in all examples the content ratio of free fat is lower than that of comparative example.

In this regards, the relative humidity can be measured with a commercial hygrometer. For example, up to 180° C. it can be measured with the hygrometer HMT330 from Vaisala, and up to 350° C. with the dew point transmitters DMT345 from Vaisala. In addition, the relative humidity may also be converted by measuring the absolute humidity (volumetric absolute humidity (the unit is g/m$^3$) or weight absolute humidity (the unit is kg/kg DA), where DA represents dry air) and calculating the ratio (%) of water vapor partial pressure to saturation water vapor pressure at that temperature.

REFERENCE SIGNS LIST

10 Body
10A First face
10B Second face
10C Lateral face
10S Solid milk

The invention claimed is:

1. A method for producing a solid milk having a solid form obtained by compression molding a powdered milk, the method comprising:
   compression molding the powdered milk to form a compression molded body of the powdered milk; and
   performing a hardening treatment on the compression molded body of the powdered milk,
   wherein the hardening treatment comprises a humidification treatment and a drying treatment, and in the humidification treatment the compression molded body of the powdered milk is placed under an environment of a humidity of more than 0% relative humidity (RH) to 100% relative humidity (RH) or less and a temperature of higher than 100° C.

2. The method for producing a solid milk according to claim 1, wherein in the humidification treatment, the temperature is higher than 100° C. to 330° C. or lower.

3. The method for producing a solid milk according to claim 1, wherein in the humidification treatment, the temperature is 130° C. or higher to 210° C. or lower.

4. The method for producing a solid milk according to claim 1, wherein in the humidification treatment, the humidity is 0.1% RH or more to 20% RH or less.

5. The method for producing a solid milk according to claim 1, wherein in the humidification treatment, the humidity is 0.1% RH or more to 15% RH or less.

6. The method for producing a solid milk according to claim 1, wherein in the drying treatment, the compression molded body of the powdered milk is placed under an environment of a humidity of 0% RH or more to 30% RH or less and a temperature of 80° C. or higher to 330° C. or lower.

7. The method for producing a solid milk according to claim 2, wherein in the drying treatment, the compression molded body of the powdered milk is placed under an environment of a humidity of 0% RH or more to 30% RH or less and a temperature of 80° C. or higher to 330° C. or lower.

8. The method for producing a solid milk according to claim 3, wherein in the drying treatment, the compression molded body of the powdered milk is placed under an environment of a humidity of 0% RH or more to 30% RH or less and a temperature of 80° C. or higher to 330° C. or lower.

9. The method for producing a solid milk according to claim 4, wherein in the drying treatment, the compression molded body of the powdered milk is placed under an environment of a humidity of 0% RH or more to 30% RH or less and a temperature of 80° C. or higher to 330° C. or lower.

10. The method for producing a solid milk according to claim 5, wherein in the drying treatment, the compression molded body of the powdered milk is placed under an environment of a humidity of 0% RH or more to 30% RH or less and a temperature of 80° C. or higher to 330° C. or lower.

* * * * *